(12) United States Patent
Tonkovich et al.

(10) Patent No.: US 9,452,407 B2
(45) Date of Patent: Sep. 27, 2016

(54) MICROCHANNEL APPARATUS, METHODS OF MAKING MICROCHANNEL APPARATUS, AND PROCESSES OF CONDUCTING UNIT OPERATIONS

(75) Inventors: Anna Lee Tonkovich, Marysville, OH (US); Gary Roberts, West Richland, WA (US); Sean P. Fitzgerald, Columbus, OH (US); Timothy M. Werner, Traverse City, MI (US); Matthew B. Schmidt, Columbus, OH (US); Robert J. Luzenski, Marysville, OH (US); G. Bradley Chadwell, Reynoldsburg, OH (US); James A. Mathias, Columbus, OH (US); Abhishek Gupta, Dublin, OH (US); David J. Kuhlmann, Powell, OH (US); Thomas D. Yuschak, Dublin, OH (US)

(73) Assignee: Velocys, Inc., Plain City, OH (US)

( * ) Notice: Subject to any disclaimer, the term of this patent is extended or adjusted under 35 U.S.C. 154(b) by 1037 days.

(21) Appl. No.: 11/255,633

(22) Filed: Oct. 24, 2005

(65) Prior Publication Data
US 2006/0108397 A1 May 25, 2006

Related U.S. Application Data

(62) Division of application No. 10/306,722, filed on Nov. 27, 2002, now Pat. No. 6,989,134.

(51) Int. Cl.
*B21D 39/00* (2006.01)
*B23K 31/02* (2006.01)
*B01J 19/00* (2006.01)
(Continued)

(52) U.S. Cl.
CPC ............ *B01J 19/0093* (2013.01); *B01F 5/061* (2013.01); *B01F 13/0059* (2013.01); *B23K 20/023* (2013.01); *B23K 31/02* (2013.01); *F28D 9/0062* (2013.01); *F28F 3/048* (2013.01); *F28F 13/06* (2013.01); *B01J 2219/00783* (2013.01);
(Continued)

(58) Field of Classification Search
USPC .............. 228/178, 182, 183, 190, 245, 249
See application file for complete search history.

(56) References Cited

U.S. PATENT DOCUMENTS 3,176,763 A  4/1965 Frohlich
3,466,737 A  9/1969 Hanink
(Continued)

FOREIGN PATENT DOCUMENTS

EP  1306639 A2  5/2003
EP  1382382 A1  7/2003
(Continued)

OTHER PUBLICATIONS

Examiner's Report on Australian Patent Application No. 2003304489, issued Nov. 26, 2008 (3 pages).
(Continued)

*Primary Examiner* — Aaron Austin
*Assistant Examiner* — Megha Gaitonde
(74) *Attorney, Agent, or Firm* — Frank Rosenberg

(57) ABSTRACT

Novel methods of making laminated, microchannel devices are described. Examples include: assembly from thin strips rather than sheets; and hot isostatic pressing (HIPing) to form devices with a hermetically sealed wall. Laminated microchannel articles having novel features are also described. The invention includes processes conducted using any of the articles described.

19 Claims, 18 Drawing Sheets

(51) Int. Cl.
    *B01F 5/06*          (2006.01)
    *B01F 13/00*        (2006.01)
    *B23K 20/02*        (2006.01)
    *F28D 9/00*         (2006.01)
    *F28F 3/04*         (2006.01)
    *F28F 13/06*        (2006.01)

(52) U.S. Cl.
    CPC ............... *B01J2219/00835* (2013.01); *B01J 2219/00873* (2013.01); *F28F 2260/02* (2013.01)

(56) References Cited

U.S. PATENT DOCUMENTS

| | | | |
|---|---|---|---|
| 3,854,194 A | | 12/1974 | Woodward |
| 4,438,809 A | | 3/1984 | Papis |
| 4,516,632 A | * | 5/1985 | Swift et al. ............. 165/167 |
| 4,651,811 A | | 3/1987 | Frauenfeld |
| 4,953,634 A | | 9/1990 | Nelson |
| 4,988,036 A | * | 1/1991 | Kemble et al. ............. 228/217 |
| 5,016,707 A | | 5/1991 | Nguyen |
| 5,156,316 A | * | 10/1992 | Nied et al. ............. 228/2.1 |
| 5,534,328 A | | 7/1996 | Ashmead et al. |
| 5,553,770 A | * | 9/1996 | Jha et al. ............. 228/190 |
| 5,683,828 A | * | 11/1997 | Spear et al. ............. 429/13 |
| 5,727,618 A | * | 3/1998 | Mundinger et al. ......... 165/80.4 |
| 5,811,062 A | | 9/1998 | Wegeng et al. |
| 5,829,517 A | | 11/1998 | Schmid |
| 5,835,345 A | | 11/1998 | Staskus et al. |
| 5,853,674 A | * | 12/1998 | Lesieur ............. 422/173 |
| 5,997,826 A | | 12/1999 | Lodeng et al. |
| 6,165,633 A | | 12/2000 | Negishi et al. |
| 6,192,596 B1 | | 2/2001 | Bennett et al. |
| 6,220,497 B1 | | 4/2001 | Benz et al. |
| 6,258,263 B1 | * | 7/2001 | Henderson et al. ......... 210/198.2 |
| 6,332,568 B1 | | 12/2001 | Christenson |
| 6,413,331 B1 | * | 7/2002 | Hurd et al. ............. 148/528 |
| 6,494,614 B1 | | 12/2002 | Bennett et al. |
| 6,508,862 B1 | | 1/2003 | Tonkovich et al. |
| 6,517,234 B1 | | 2/2003 | Kopf-Sill et al. |
| 6,537,506 B1 | | 3/2003 | Schwalbe et al. |
| 6,613,446 B1 | | 9/2003 | Peters et al. |
| 6,622,519 B1 | | 9/2003 | Mathias et al. |
| 6,989,134 B2 | | 1/2006 | Tonkovich et al. |
| 2001/0018140 A1 | | 8/2001 | Hermann |
| 2002/0031471 A1 | | 3/2002 | Tonkovich et al. |
| 2002/0079087 A1 | | 6/2002 | Vafai et al. |
| 2002/0125001 A1 | | 9/2002 | Kelly et al. |
| 2002/0187090 A1 | | 12/2002 | Vanden Bussche et al. |
| 2002/0195342 A1 | | 12/2002 | Lee et al. |
| 2003/0027354 A1 | | 2/2003 | Geli |
| 2003/0043544 A1 | | 3/2003 | Nelson et al. |
| 2003/0068261 A1 | | 4/2003 | Taheri et al. |
| 2003/0152488 A1 | * | 8/2003 | Tonkovich et al. ............. 422/99 |
| 2003/0219903 A1 | | 11/2003 | Wang et al. |
| 2004/0013585 A1 | | 1/2004 | Whyatt et al. |
| 2004/0031592 A1 | | 2/2004 | Mathias et al. |
| 2004/0045642 A1 | * | 3/2004 | Bonet ............. 148/528 |
| 2004/0055329 A1 | | 3/2004 | Mathias et al. |
| 2004/0082804 A1 | | 4/2004 | Brophy et al. |
| 2004/0099712 A1 | | 5/2004 | Tonkovich et al. |

FOREIGN PATENT DOCUMENTS

| | | | |
|---|---|---|---|
| GB | | 1227464 | 4/1971 |
| WO | | WO 02/49401 * | 6/2002 |
| WO | | WO 02/063636 A2 | 8/2002 |
| WO | | WO 03/031050 | 4/2003 |
| WO | | WO 03/033985 | 4/2003 |

OTHER PUBLICATIONS

Examiner's Report No. 3 in Australian Patent Application No. 2003304489, mailed Apr. 24 and received Apr. 27, 2009.
Third Office Action from Australian Patent Application No. 2003304489, Apr. 2009.

* cited by examiner

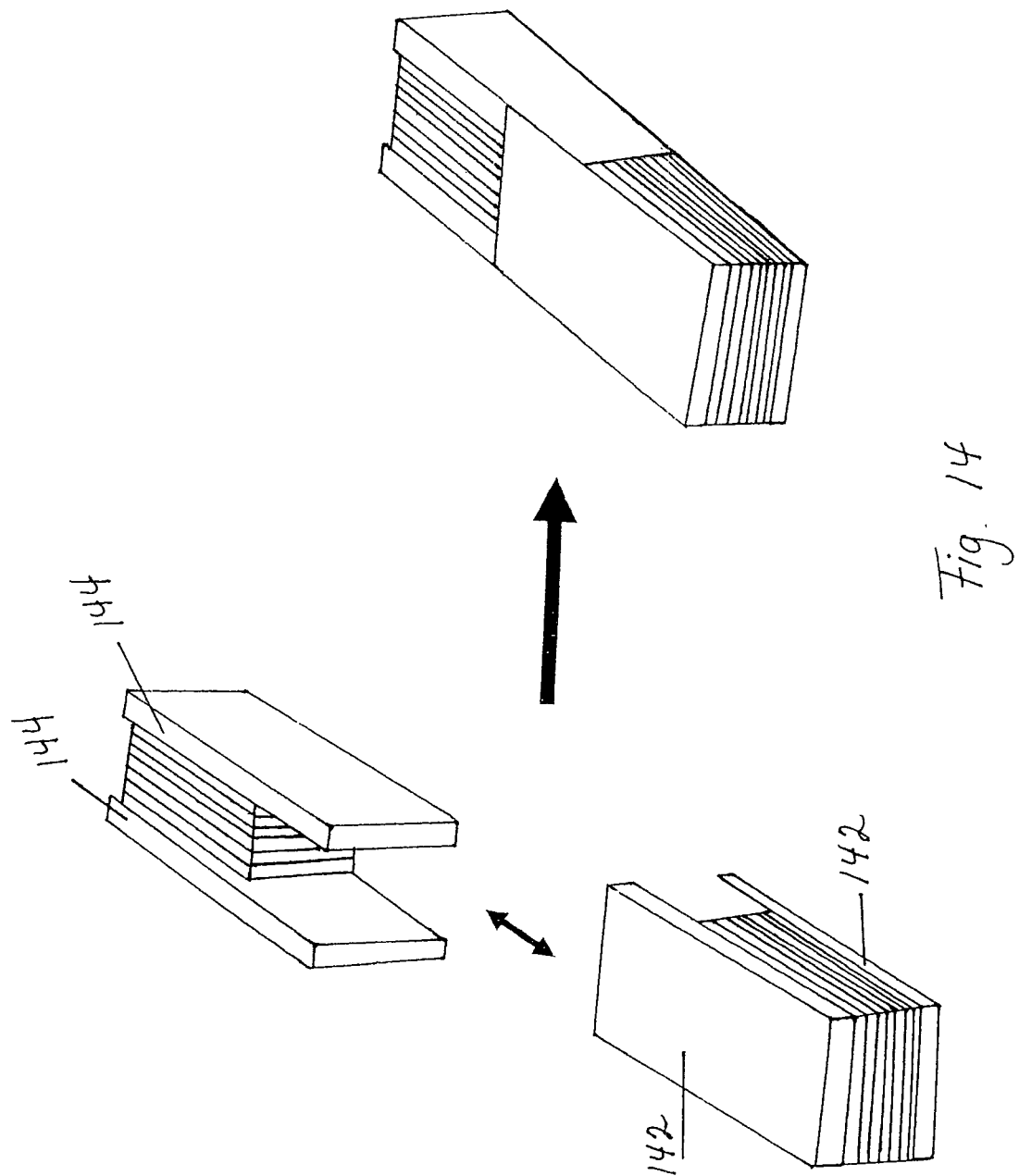

MICROCHANNEL APPARATUS, METHODS OF MAKING MICROCHANNEL APPARATUS, AND PROCESSES OF CONDUCTING UNIT OPERATIONS

RELATED APPLICATIONS

This application is a divisional of U.S. patent application Ser. No. 10/306,722, filed on Nov. 27, 2002, now U.S. Pat. No. 6,989,134.

INTRODUCTION

In recent years there has been intense industrial and academic interest toward developing microscale devices for chemical processing. A recent review of microscale reactors, containing 236 citations, has been provided by Gavrilidis et al., "Technology And Applications Of Microengineered Reactors," Trans. IChemE, Vol. 80, Part A, pp. 3-30 (January 2002). Microscale chemical processors, which are characterized by fluid channel dimensions of about 5 mm or less, can provide unique advantages due to short heat and mass transfer distances, and, in some instances, different flow characteristics. Although these devices offer many advantages, making such devices presents new difficulties and requires novel methods of construction.

The recent patent literature describes multiple types of microscale devices and/or methods of manufacture. For example, Wegeng et al., in WO 01/95237 A2, described novel types of integrated reactors that are made by laminated sheets of numerous different designs. Benz et al., in U.S. Pat. No. 6,220,497, disclosed a method for soldering a stack of microstructured plates resulting in a laminated stack in which a solder layer is present between each pair of adjacent plates. The soldering is applied under vacuum or in an inert atmosphere, then heat and pressure is applied to join the plates. Pence et al., in US 2002/0080563 A1, described devices with a network of branching microchannels for heat transport.

A variety of non-microscale, plate-type heat exchangers have long been known. For example, Frölich in U.S. Pat. No. 3,176,763 (issued in 1965) disclosed a heat exchanger made by gluing spacer strips between parallel plates. Nicholson in U.S. Pat. No. 4,183,403 (issued in 1980) disclosed a heat exchanger with corrugated plates that were separated by spacer bars. This patent describes a process of arc welding the heat exchanger assembly, then coating with a brazing compound and passing through a brazing cycle. Frauenfeld et al. in U.S. Pat. No. 4,651,811 (issued in 1987) described a heat exchanger in which slat-like spacer moldings are spot welded to plate-like heat exchanger elements.

SUMMARY OF THE INVENTION

In a first aspect, the invention provides a method of making a laminated device, that includes the steps of: placing a thin strip on a substrate; and placing an alignment pin through the alignment aperture in the thin strip. The thin strip has an alignment aperture; and the alignment pin helps to align the thin strip on the substrate. The area of a "thin strip" is 50% or less of the area of the stack in which the thin strip is placed. In this application, length of a thin strip is the longest dimension of a strip. Width is perpendicular to length and thickness. Thickness is the stacking direction in a laminated device. In some preferred embodiments, the aligned strip and substrate are subsequently bonded by a technique such as brazing, ram pressing, hot isostatic pressing (HIPing), and/or welding.

In a second aspect, the invention provides a method of making a laminated device, comprising: providing a first strip having a thin portion and a first mating feature disposed in the thin portion; providing a second strip or a sheet comprising a second mating feature disposed in the second strip or sheet; wherein the first mating feature and the second mating feature fit together in a lock and key fashion; and connecting the first mating feature on the first strip to the second mating feature on the second strip or sheet. The "thin portion" refers to width and means that the strip has a width that is less than the width of the stack used to form the laminated device; preferably, the width of the thin portion is at least 50% less than the width of the stack. Width and length of a "thin strip" or "thin portion" are perpendicular to thickness and are mutually perpendicular; width is arbitrarily selected to be shorter than length (except for a square strip in which case, length equals width). For the purpose of defining this second aspect, width of the stack is defined to be the same direction as width of the strip when the strip is mated to the second strip or sheet within the laminated device. In some preferred embodiments, the first and second strips are bonded by a technique such as: brazing, ram pressing, HIPing, and/or welding. In some preferred embodiments, an end of the first strip is connected to an end of the second strip. In some preferred embodiments, the first strip and second strips are straight and are connected such that first end of the first strip, the second end of the first strip, the first end of the second strip, and the second end of the second strip are linear.

In another aspect, the invention provides a method of making a laminated device, comprising: providing a first sheet or thin strip; pressing on a portion of the first sheet or strip to create an first indentation; placing the first sheet or thin ship on a substrate that has an second indentation such that the first indentation nests in the second indentation or that the second indentation nests in the first indentation; and bonding the first sheet or thin strip to the substrate to form a laminated device. The sheet or strip is not elastic under the pressing conditions so that an indentation remains after the pressure is removed. The method also includes making multiple indentations and/or bumps within a sheet or strip, and in preferred embodiments, the multiple indentations and/or bumps mate with corresponding bumps and/or indentations.

In another aspect, the invention provides a laminated device, comprising multiple laminae, wherein at least one of the laminae comprises a first portion and a second portion. The at least one lamina has a circumference; the first portion forms part of the circumference but doesn't extend around the entire circumference, and the second portion forms part of the circumference but doesn't extend around the entire circumference. There is also a bonding section that connects the first portion and the second portion. Bonding techniques, such as welding or diffusion bonding invariably result in a bonding layer or section that has a different composition and/or different morphology and/or different physical characteristics as compared with either of the components being joined. In most instances a bonding layer will remain in the final device; however, in some exceptional cases, it is possible to heat treat for prolonged periods to homogenize the material and eliminate a bonding layer. In any event, the article described in this aspect, as well as all articles described herein, include intermediate articles or intermediate devices that are produced during manufacturing as well as the devices that are ultimately obtained.

In another aspect, the invention provides a method of making a laminated device, comprising: connecting a first thin strip to a second thin strip to form at least a portion of a lamina; and bonding the resulting lamina into a laminated device. In a preferred embodiment, a set of at least two parallel strips are connected by another strip. In some preferred embodiments, there are two parallel strips with at least one strip that is perpendicular to the parallel strips and is connected to one of the strips and extends in a direction toward the other parallel strip but not extending all the way to the other strip. In some preferred embodiments, two sets of parallel strips are connected to form a square with an opening therethrough; preferably, this square forms a circumference or the laminated device. As with any of the methods of making a laminated device, the method may further include a HIPing step to seal the circumference of a device.

In another aspect, the invention provides a laminated device, comprising: a sheet having a width and a length; a flow modifier disposed on the sheet, wherein the flow modifier has a thickness of 5 mm or less, a length that is less than the length of the sheet, and a width that is less than the width of the sheet; and a bonding layer disposed between the flow modifier and the sheet.

In another aspect, the invention provides a method of making a laminated device, comprising: placing a metal can around a stack of laminae; pressing the can against the stack of laminae; and reducing the pressure to result in an article comprising metal sheeting bonded onto the sides of the stack of laminae.

In another aspect, the invention provides a laminated device comprising: a stack of laminae and a metal sheet around and in intimate contact with the circumference. Preferably, the metal sheet provides a hermetic seal around the circumference of the laminated device. Preferably, the metal sheet is wrinkle-free. In some preferred embodiments, the metal sheet surrounds all sides of a stack.

In another aspect, the invention provides a laminated article, comprising: a sheet comprising a first rib set comprising plural ribs that divide at least three flow paths; and further comprising at least one flow modifier selected from the group consisting of: a flow modifier offset from the plural ribs of the first rib set disposed such that fluid flow in a straight path through the first rib set would impinge upon the flow modifier, or a second rib set that contains fewer ribs than the first rib set and is disposed closer to a fluid outlet than is the first rib set. Each of the plural ribs have lengths that are shorter than the length of the sheet such that openings exist that permit fluid communication between the at least three flow paths.

In a further aspect, the invention provides a laminated, microchannel device, comprising: a first section comprising a first layer comprising a microchannel, and a second layer comprising a channel that is adjacent to the microchannel The first layer is substantially planar and the second layer is substantially planar. A second section is connected to the first section, wherein the second section comprises a third layer comprising a channel that is directly connected to the microchannel, wherein the third layer is substantially planar and has a third thickness that is at least as great as the sum of the first and second thicknesses. The microchannel and the channel in the third layer are connected so that a fluid can pass directly from the microchannel into the channel without changing directions. The second section is not a header or footer; and the device is constructed such that, during operation of the device, a unit operation occurs in both the first section and the second section. In some preferred embodiments, there is a catalyst in the microchannel and channel. In some preferred embodiments, there are flow modifiers in one or more of the channels. In some preferred embodiments, the microchannel and the channel in the second layer have a cross-flow relationship. These preferred embodiments are not intended to limit the invention, which can have any of the features described in the detailed description section.

In another aspect, the invention provides a method of making a laminated device, comprising: providing a substrate having a surface, the surface having a first section and a second section; stacking a first support on the first section of the surface of the substrate and stacking a first thin sheet over the support and thus forming a microchannel between the substrate and the thin sheet, wherein the microchannel has a thickness defined by the surface of the support and a first surface of the thin sheet; wherein the first support has a thickness that is substantially equal to the thickness of the microchannel; stacking a second support on the second section of the surface of the substrate and a second thin sheet over the second support and thus forming a first channel between a second surface of the first thin sheet and a surface of the second thin sheet, and thus forming a second channel between the substrate and the surface of the second thin sheet, and wherein the second support has a thickness that is greater than the thickness of the first support; and providing channel walls on the surface of the substrate and adjacent to the microchannel such that there is a continuous flow path between the microchannel and the second channel; and wherein the thickness of the second channel is greater than the thickness of the microchannel. By providing channel walls it is meant that channel walls may be part of a preformed piece or may be formed into a component. By stating that a thickness is "substantially" equal to a thickness allows for some deviation in thickness such as might be caused by an adhesive or braze layer or other slight variation. A non-limiting example of this aspect is illustrated in FIG. 15. In some preferred embodiments, flow modifiers are stacked on the substrate. In some preferred embodiments, the substrate is a thin sheet. In some preferred embodiments, a catalyst is added to the microchannel and/or channel.

In still another aspect, the invention provides a process of conducting a unit operation in an integrated, laminated, microchannel device, comprising: passing a process stream into a microchannel in a first section of a laminated device; and conducting a Flit operation on the process stream as it passes through the microchannel and exchanging heat between the process stream in the microchannel and an adjacent heat exchange channel; in this process, the microchannel is connected to a channel that is located in a second section of the laminated device; and conducting a unit operation (in some preferred embodiments, the same unit operation) on the process stream as it passes through the second section. In this process, the channel in the second section has a cross-sectional area that is greater than a cross-sectional area of the microchannel. The heat exchange volume percentage of the first section is greater than the heat exchange volume percentage of the second section. The heat exchange volume percentage is defined as the volume percent of a section that is occupied by heat exchange channels. In some preferred embodiments, the unit operation is an exothermic reaction. In some preferred embodiments, the first section comprises at least twice as man) microchannels as channels ill second section. In some preferred embodiments (such as where the unit operation is an exothermic reaction), the second section is downstream of the first section. In preferred embodiments, the first and second sections are positioned adjacently so that a process stream can flow in a substantially straight path from the first section to the second section. In some preferred embodiments, there is stepwise (discontinuous) increase in cross-sectional area of a channel at the border of the first and second sections. In some embodiments, there are third, fourth, etc. sections with increasing cross-sectional area of a continuous channel. That sections are "connected" means that flow passes directly from one section to another section without intervening headers or footers.

In a further aspect, the invention provides a method of making a laminated device comprising a flow modifier, comprising: providing a substrate, placing a flow modifier on the substrate, using a fixture to align the flow modifier, wherein the fixture has at least 2 slots, wherein one slot is sized to accommodate the flow modifier one slot is placed over another feature and the relative position of the slots is used to locate the flow modifier on a laminate; and bonding the flow modifier to the substrate to form a laminated device capable of conducting a unit operation. In some preferred embodiments, a flow modifier is aligned using at least two fixtures. In some preferred embodiments, one or more fixtures are used to simultaneously locate at least two flow modifiers. In some preferred embodiments, the fixture is used to align a flow modifier where an edge piece or pieces surround the flow modifier on a substantially planar substrate, typically (but not exclusively) this is where an edge extends completely around a substrate.

In another aspect, the invention provides a laminated microchannel device, comprising: a first section comprising plural layers wherein the thickness of each of said plural layers is substantially less than the width and the length of each layer, and wherein there is at least one microchannel in each of said plural layers; a second section comprising plural layers wherein the thickness of each of said plural layers is substantially less than the width find the length of each layer, and wherein there is at least one channel in each of said plural layers; the first section and the second subassembly are connected such that the plural layers of the first subassembly are perpendicular to the plural layers of the second section. Most commonly, the "section" is derived from a subassembly, but this aspect of the invention concerns the device and not the method by which it is made. In some preferred embodiments, the device is constructed from interlocking subassemblies such as subassemblies having interlocking end plates. In some preferred embodiments, the device further comprises one or more of the following: a header and/or footer, heat exchange channels interleaved with process channels in one or both sections, a third section connected to the second section, and/or at least 4 layers within one or more sections. In some preferred embodiments a channel or channels in the first section are in direct contact with a channel or channels in the second section. In some preferred embodiments, a microchannel in the first subassembly is connected to a channel in the second subassembly, wherein the microchannel in the first subassembly that is connected to the channel in the second subassembly has a cross-sectional area, wherein the channel in the second subassembly that is connected to the microchannel in the first subassembly has a cross-sectional area that is larger than the cross-sectional area of the microchannel.

In a further aspect, the invention provides a method of making a microchannel device, comprising: bringing into contact a first subassembly and a second subassembly; wherein the first subassembly comprises plural layers wherein the thickness of each of said plural layers is substantially less than the width and the length of each layer, and wherein there is at least one microchannel in each of said plural layers; wherein the second subassembly comprises plural layers wherein the thickness of each of said plural layers is substantially less than the width and the length of each layer, and wherein there is at least one channel in each of said plural layers, wherein the first subassembly and the second subassembly are contacted such that a microchannel in the first subassembly is contacts a channel in the second subassembly; and bonding the first subassembly to the second subassembly such that the plural layers of the first subassembly are perpendicular to the plural layers of the second subassembly.

In another aspect, the invention provides a method of making a laminated device, comprising: providing a first thin strip having a length-to-width aspect ratio of at least 10 and a length of at least 5 cm; providing a second thin strip having a length-to-width aspect ratio of at least 10 and a length of at least 5 cm; placing the first and second strips on a stack so that the strips lie within the same plane wherein the plane is perpendicular to thickness; and bonding the first and second strips into the stack such that the strips form walls of a microchannel and the distance between the strips varies by less than 0.5 mm (more preferably less than 0.2 mm, and still more preferably less than 0.05 mm) over the length of the strips.

In a further aspect, the invention provides a method of making a laminated device, comprising: stacking plural components to form a stack of components; and bonding the stack of components using gradual heating and cooling under at least one of the following conditions: heating and cooling at a rate of 1° C. per minute or less; or heating and cooling the stack through a thermal cycle of at least 18 hours.

In some preferred embodiments, the laminated devices are chemical reactors that are capable of processing fluid streams. The invention also includes devices having any of the structural features or designs described herein. For example, the invention includes a device having exothermic reaction channels in an interleaved relationship with coolant and/or endothermic reaction channels; and having one or more flow modifiers in the reaction channels and/or being comprised of subassemblies at right angles to each other. In preferred embodiments, aspects of the invention are combined; for example, any of the catalysts described herein may be selected to be incorporated into a reaction channel in any of the laminate designs described herein.

For all of the methods of making devices that are described herein, the invention also includes laminated devices made by the method. The invention also includes processes of conducting a unit operation (or operations) using any of the devices, structural features, designs or systems described herein.

The use of the fabrication techniques described herein can be applied to all devices for all chemical unit operations, including chemical reactors, combustors, separators, heat exchangers, and mixers. The applications may include both gaseous and liquid fluid processing. Liquid fluid processing may also include the generation of suspended solids in continuous liquid fluid phases.

Preferably, the inventive articles and/or methods do not contain and/or use a release layer.

Any of the articles described herein may have multiple layers and repeating sets of layers (repeating units). For example, 2, 10, 50 or more repeating units within a laminate. This multiplicity, or "numbering up" of layers creates added capacity of microchannel laminated devices.

Various embodiments of the present invention may possess advantages such as: lower costs, less waste, superior flow characteristics, and the ability to stack components to make very small features in relatively large devices (for example, 0.1 mm wide ribs with 0.1 mm inter-rib spaces extending for 30 cm or more). In some preferred embodiments, methods of the invention can be characterized by their efficient use of materials, for example producing articles with internal microchannels, where casting is not used, and essentially no material is wasted—this may be contrasted to stamping or ablative methods in which material is removed in the process of forming the device.

GLOSSARY

As is standard patent terminology, "comprising" means "including" and neither of these terms exclude the presence of additional or plural components. For example, where a device comprises a lamina, a sheet, etc., it should be understood that the inventive device may include multiple laminae, sheets, etc.

"Bonding" means attaching or adhering, and includes diffusion bonding, gluing, brazing and welding.

"Circumference" of a stack is the distance around the length and width of a laminate, as measured in plane that is perpendicular to thickness (i.e., perpendicular to the stacking direction).

"Sheets" refer to substantially planar plates or sheets that can have any width and length and preferably have a thickness (the smallest dimension) of 2 millimeter (mm) or less, more preferably 0.040 inch (1 mm) or less, and in some preferred embodiments between 50 and 500 µm. Width and length are mutually perpendicular and are perpendicular to thickness. In preferred embodiments, a sheet has length and width that are coextensive the length and width of the stack of laminae in which the sheet resides. Length of a sheet is in the direction of flow; however, in those cases in which the direction of flow cannot be determined, length is the longest dimension of a sheet.

A "thin strip" has a thickness of 5 mm or less, preferably less than 2 mm, and more preferably less than 1 mm. Length is the longest dimension of a strip. Width is perpendicular to length and thickness. Area is (length×width). The area of a thin strip is 50% or less, preferably 30% or less and in some embodiments 10% or less, of the area of the sheet, substrate or laminated stack on which the thin strip is placed. In some preferred embodiments, thin strips have a length-to-width aspect ratio of 10 or more, 50 or more, and 100 or more.

"Unit operation" means chemical reaction, vaporization, compression, chemical separation, distillation, condensation, mixing, heating, or cooling. A "unit operation" does not mean merely fluid transport, although transport frequently occurs along with unit operations. In some preferred embodiments, a unit operation is not merely mixing.

A "laminated device" is a device made from laminae that is capable of performing a unit operation on a process stream that flows through the device.

A "microchannel" has at least one internal dimension of 5 mm or less. A microchannel has dimensions of height, width and length. The height and/or width is preferably about 2 mm or less, and more preferably 1 mm or less. The length is typically longer. Preferably, the length is greater than 1 cm, more preferably in the range of 1 to 50 cm. A microchannel can vary in cross-section along its length, but a microchannel is not merely an orifice such as an inlet orifice.

An "open channel" is a gal) of at least 0.05 mm that extends all the way through a reaction channel such that gases can flow through the reaction channel with relatively low pressure drop.

"Process channel volume" is the internal volume of a process channel. This volume includes the volume of the catalyst (if present), the open flow volume (if present). This volume does not include the channel walls. For example, a reaction chamber that is comprised of a 2 cm×2 cm×0.1 cm catalyst and a 2 cm×2 cm×0.2 cm open volume for flow immediately adjacent to the catalyst, would have a total volume of 1.2 $cm^3$.

The cross-sectional area of a layer excludes the area of channel walls but includes the area of flow modifiers. A layer typically includes plural channels that are separated by chapel walls. The cross-sectional area of a channel excludes area taken up by flow modifiers.

"Thickness" is measured in the stacking direction.

BRIEF DESCRIPTION OF THE FIGURES

FIG. 14 shows subassemblies with interlocking substrates that can be brought together in the illustrated orientation.

DETAILED DESCRIPTION OF THE INVENTION

Figure 1:
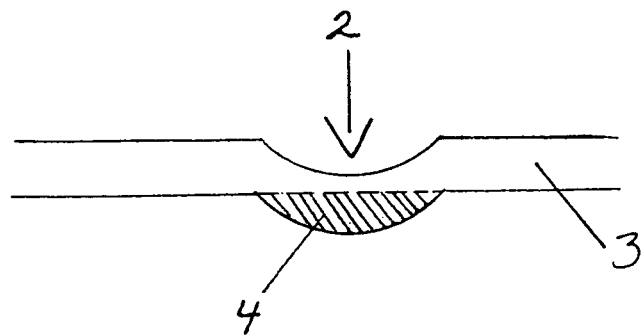
FIG. 1 is a cross-sectional view of an indented component.

Sheets and strips for forming laminated devices can be formed by processes including: conventional machining, wire EDM, plunge EDM, laser cutting, molding, coining, water jet, stamping, etching (for example, chemical, photochemical and plasma etch) and combinations thereof. For low cost, stamping to cut apertures through a sheet or strip is especially desirable. In coining, a deformable sheet or strip is subjected to a force 2 that forms a shaped sheet or strip 3 such as shown in FIG. 1. Any shaping or forming process can be combined with additional steps, for example the shaded region 4 in FIG. 1 could be machined off to flatten one surface. Some of the inventive methods can also be characterized by the absence of certain forming techniques; for example, some preferred methods do not utilize etching, casting, melting a powder, molding, chemical or physical deposition, etc.

To form a laminated device, a sheet or strip is stacked on a substrate. For purposes of the present invention, a substrate is broadly defined to include another sheet or strip or a thicker component that could be, for example, a previously bonded sheet stack. Preferably, multiple sheets and/or strips are aligned in a stack before bonding. In some embodiments, a brazing compound is placed on one or more surfaces of a sheet or strip (or plural sheets and/or strips) to assist bonding. Flow modifiers (described below) can be incorporated in laminated devices with the same techniques.

Figure 2:
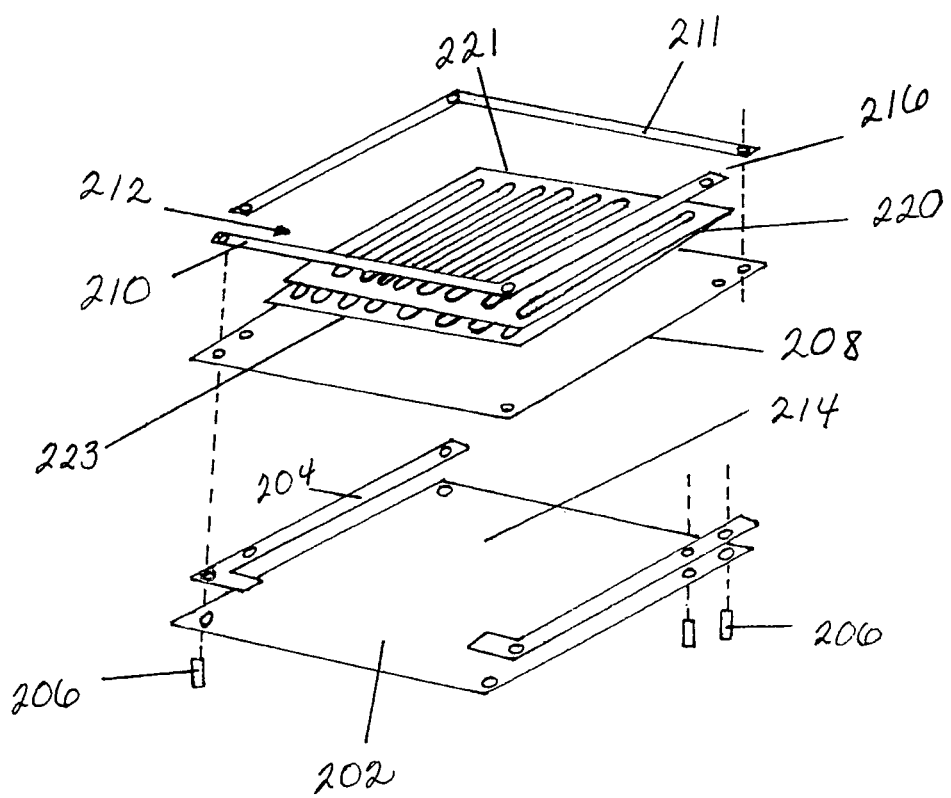
FIG. 2 is an exploded view of a laminated device assembled with alignment pins.

Sheets and strips should be aligned in a stack. Alignment can be achieved by making sheets and/or strips with alignment apertures and then using alignment pins to align the sheets and/or strips in a stack. An example is illustrated in FIG. 2 which shows alignment pins used to create a microchannel reactor with integrated heat exchange. A first sheet 202 is placed down, onto which strips 204 are placed around the perimeter. The strips are located via use of alignment pins 206. A second sheet 208 is placed onto the pins, completing the formation of a rectangular, 3-dimensional cross section reaction channel 214, where the microchannel dimension is the distance between the first and second sheets. The stacking process continues with another different set of perimeter strips 210, 211 being located on the alignment pins. These strips 210, 211 have dimensions to allow for inlet 212 and outlet 216 located in the "picture frame" created by the strips 210, 211. Into the reaction channel 214 may be placed an insert (not shown) that may be a porous substance which may or may not contain a catalyst or may be a formed piece (such as corrugated piece). The purpose of the insert could be as a catalyst, to increase surface area, such as for heat transfer, or to provide structural support. An insert can be placed inside the picture frame formed by strips 210, 211. In the illustrated embodiment, two offset sheets 220 fit into the frame. The sheets 220 contain slots for fluid flow; the sheets are offset (with edge 221 of the top sheet adjacent to strip 211 and edge 223 adjacent strip 210) to provide an upper space for the inlet and a lower space for the outlet. A third sheet (not shown) could be placed on the pins with the distance between die second and third sheets being the microchannel dimension for the second stream in the device. A stack (including a subassembly that does not include all the components of a final device) can be lifted from the pins, or the pins can be removed (such as by burning or by pulling out pins), or the pins can become bonded in the stack. Another alignment technique utilizes molds for aligning sheets and/or strips; this technique can be especially useful for positioning flow modifiers such as ribs. In some embodiments, molds remain in place while the stack components are attached in place such as by welding, heating an adhesive, or diffusion bonding; subsequently, the molds are removed. In other embodiments, the mold can be removed before the components are bonded. Molds can be reusable or can be single use components that could be removed, for example, by burning out.

It should be observed that the method of forming, the laminated device, and methods of conducting a unit operation through the device that is shown in FIG. 2 and in each of die figures shown herein, while being subsets of aspects discussed in the Summary section, are also independent aspects of the invention.

Figure 3:
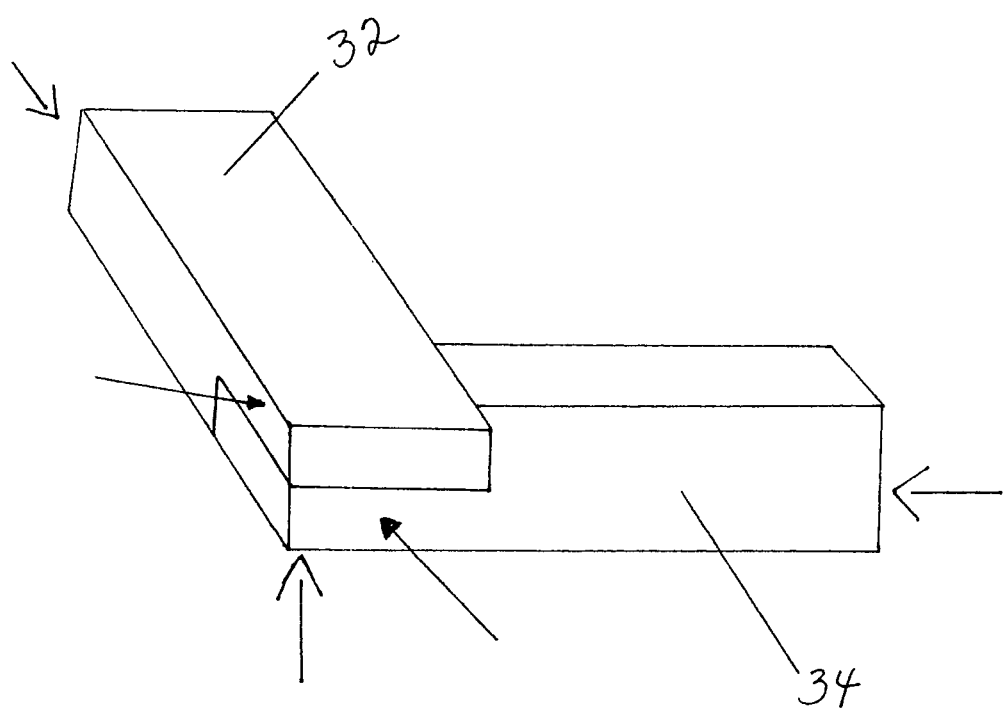
FIG. 3 illustrates isostatic pressure applied to two interlocking strips.

Another way to align sheets and/or strips is by using sheets and/or strips that interlock. These pieces can interlock (mate) with matching pieces such as shown in FIGS. 1 and 3. Interlocking features could be made, for example, by forming indentations and corresponding bumps. The indentations could be notches and the bumps corresponding ridges that fit in the notches. Preferably, the bumps are formed by a coining (pressing) step, but in less preferred embodiments, the bumps can be bonded onto the sheets or strips. Similarly, the indentations can be formed by pressing, cutting or ablating. Of course, a sheet or strip can have both indentations and bumps for better mating. FIG. 3 illustrates pressure (indicated by arrows) used to bond the interlocking strips 32, 34.

Figure 4A:
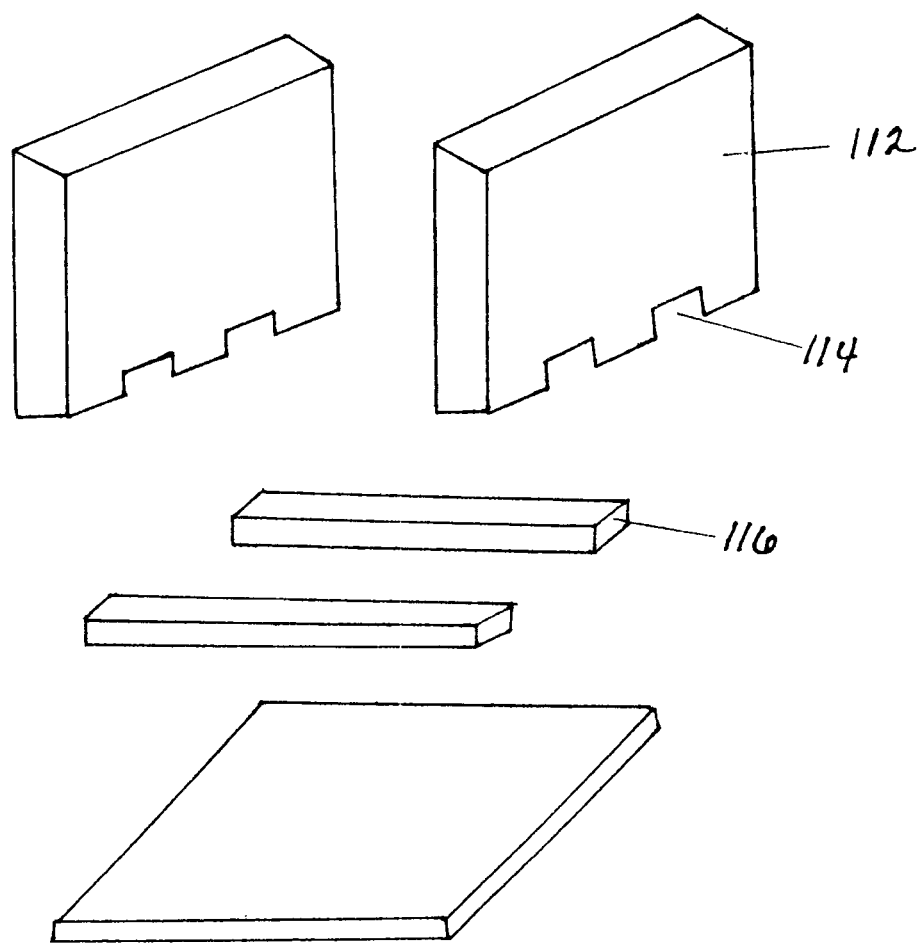
FIGS. 4A-C illustrate an assembly technique using a comb-like fixture to align strips.
Figure 4B:
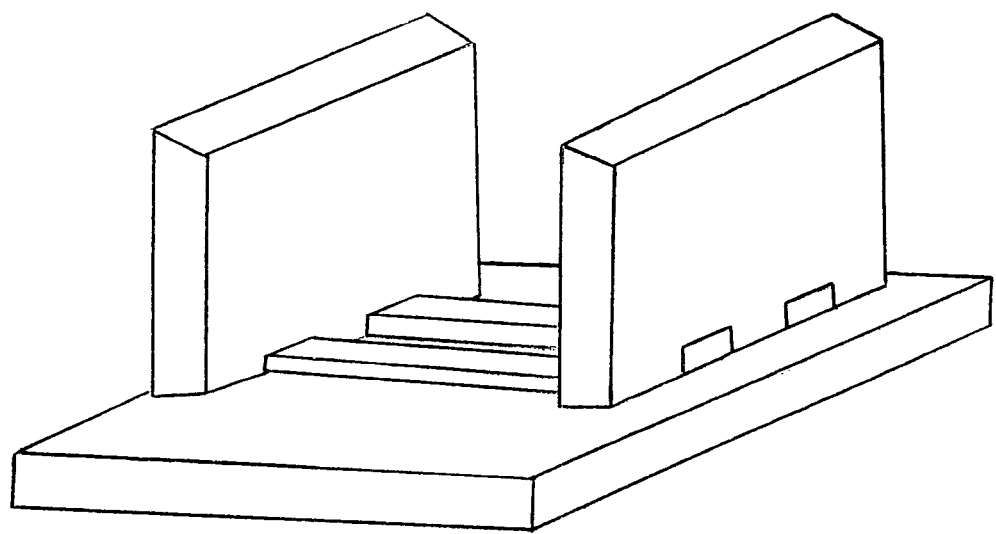
Figure 4:
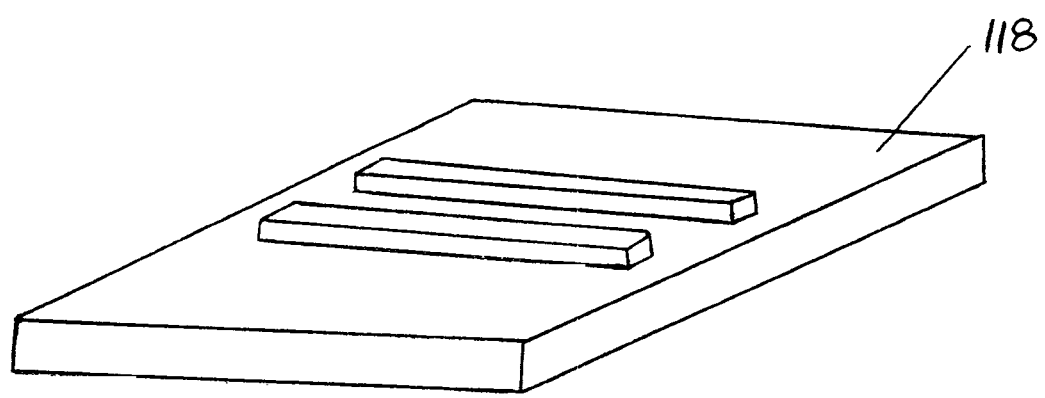
Figure 5:
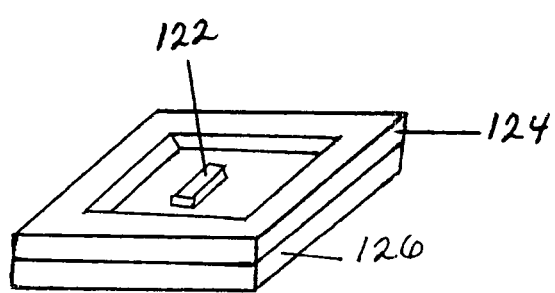
FIG. 5 shows a floating rib on a substrate.

Another alignment technique is illustrated in FIGS. 4A-4C. Removable fixture pieces 112 have slots 114 that are sized to accommodate strips 116. In the illustrated example, the strips are precisely spaced apart by the fixture 112. The fixture pieces are removed from the surface leaving precisely located strips 116 on the substrate 118 (FIG. 4C). This technique is especially advantageous for positioning long flow modifiers on a substrate; for example, 7 inch (18 cm) long (or longer) wires that are exceptionally thin (for example, 0.01 inch (0.03 cm) diameter or smaller) can be positioned on a substrate with less than a 0.001 inch (0.003 cm) variation in spacing between the wires. Another challenging problem that can be solved with this technique is illustrated in FIG. 5 which illustrates locating a floating rib 122 aligned on the substrate 126 within an edge piece 124 that might block other positioning methods. While FIG. 4 shows the fixture aligning strips relative to each other, it should be understood that the fixture could also be used to locate a feature relative to another feature such as an edge or an external part of an assembly machine (not shown).

Figure 6:
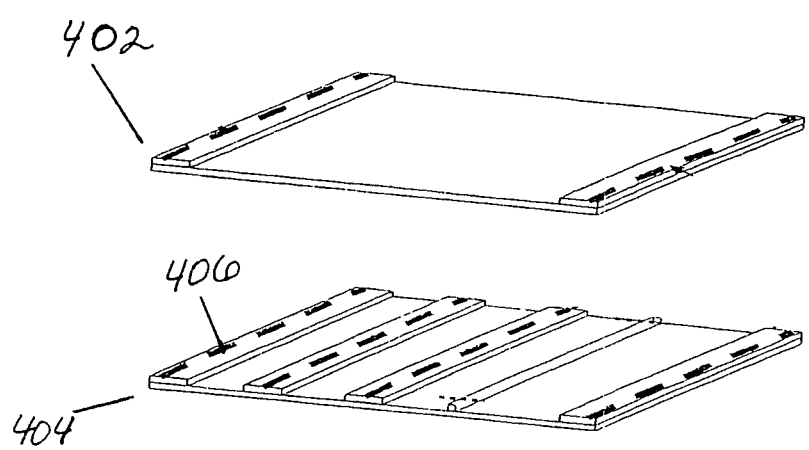
FIG. 6 is an exploded view of two subassemblies with welds.

In any of the techniques described herein, a laminated stack can be bonded in a single step or by bonding stacked subassemblies (subassemblies could, for example, be welded together). "Subassemblies" are defined is two or more components selected from sheets, strips, and flow modifiers. FIG. 6 shows two subassemblies 402, 404 with seam welds 406 for bonding the subassemblies together. In some preferred embodiments, a set of sheets and/or strips is bonded together (preferably in a single step) and the resulting bonded article is cut into multiple devices.

The sheets, strips and subassemblies may be joined together by diffusion bonding methods such as ram pressing or hot isostatic pressing (HIPing). They may also be joined together by reactive metal bonding, brazing, or other methods that create a face seal. Welding techniques, such as TIG welding, laser welding, or resistance welding, may also be used. Devices can alternatively be joined by the use of adhesives.

In cases where a full length seal is desired to provide fluid containment, seam welding can be employed to form a complete seal between a substrate, strip and/or flow modifier. Tack or spot welding can be used to hold strips, flow modifiers or subassemblies in place, without creating a complete seal along an entire edge. Usually, the tact, welded assemblies will be subjected to a subsequent bonding step.

Brazing techniques and compositions are known and can be employed in forming devices of the present invention. It has been surprisingly discovered that braze cycles longer than about 10 hours, more preferably at least 18 hours result in significantly better devices that show less distortion and have better bonding. A braze cycle is the time from the commencement of heating until the brazed article is cooled to a temperature significantly below the temperature at which the braze solidifies. Alternatively stated, it has been surprisingly discovered that heating and cooling during brazing at a temperature of 1° C./minute or less result in significantly better devices that show less distortion and have better bonding. To avoid oxidation, brazing (and other techniques that heat metal) is preferably conducted in vacuum or an inert atmosphere.

In some preferred embodiments, the pre-bonded components have a plating of a lower melting material (for example, a nickel phosphorus alloy or a nickel boron alloy) that forms a bond to a second component during heating. For example, sheets can plated and desired features stamped out of the sheets. In some embodiments, components can be stacked and a laser (or ion beam or other method of producing localized heating) focused from above on critical regions to melt the plating alloy; stacking and localized heating are continued until the article is assembled. To counter possible distortion during the localized heating, fixturing or compressive forces may be used. Another alternative is to focus a laser on the sides of a stack to cause braze to melt and resolidify upon cooling. If desired, the welded article can be placed in an oven for diffusion bonding that, for nickel-based alloys, is preferably conducted in the range of 1000 to 1050 C. Plating a bonding layer on pre-bonded components is an alternative to braze foil alloys, but plating can also be used in conjunction with braze foil alloys.

Figure 7:
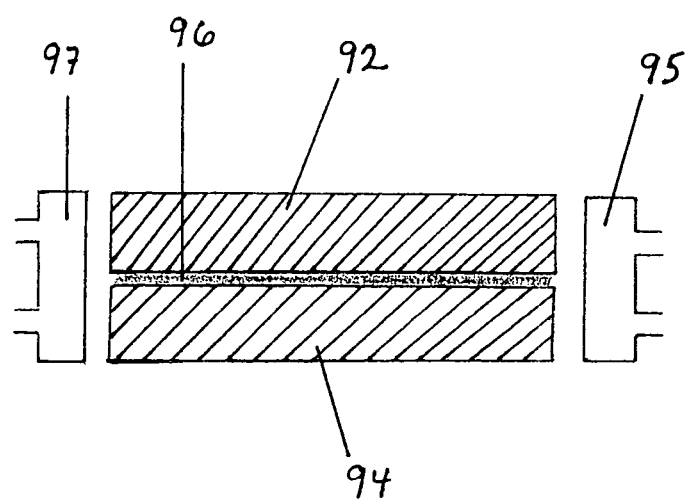
FIG. 7 is a partly exploded view of two layers with a header and footer.

We observed that the effect of thermal gradients on laminated microchannel devices appears much greater than in conventionally sized devices. It has also been unexpectedly discovered that distortions due to bonding can be greatly reduced by attaching a header or footer (preferably both) onto a stacked device before two or more parts in the stack are bonded together. An example of this construction is illustrated in FIG. 7. Components 92 and 94 are stacked together with an optional brazing material 96 sandwiched in between. Components 92 and 94 could be, for example, microchannel-containing subassemblies and 96 a braze composition. Prior to the bonding operation, a header 95, footer 97, or, more preferably, both, are welded or otherwise attached to the components. Then, when the entire assembly is heated to achieve bonding the components are held in place and much less distortion occurs.

It is desirable to avoid bonding techniques that create microchannels with sharp internal angles, as these act to concentrate stress. Instead, to distribute stress, it is desirable to form a fillet or bead at the location where components are bonded. Bonding techniques that result in curved surfaces rather than sharp internal angles where two or more components are joined together help to prevent crack initiation and propagation, thus resulting in a more stable device. Thus, in preferred embodiments, in any of the methods or devices described herein, there is one or more internal joints in a channel or microchannel that has a curved surface on the joint.

Techniques for assembly and/or bonding of devices can use the same techniques or a mixture of techniques. For example, a subassembly could be welded together and then welded to a second subassembly that itself was formed by welding. Alternatively, for example, a subassembly could be spot welded together, brazed to a second subassembly, and the combined assembly diffusion bonded.

Bonding techniques can be important for forming devices with precise tolerances. One preferred bonding method is hot isostatic pressing to achieve solid state diffusion bonding. Typically HIPing is carried out by enclosing a stack of laminae in a metal can and applying pressure at elevated temperature; the bonding pressure applied causes the surface asperities to move close enough together for solid state diffusion to occur. Although extensive macroscopic plastic deformation does not occur, localized plastic flow does take place at points where surface asperities come into contact. The pressures at the points of contact are high because contact areas are small and locally the yield point can thus be exceeded, thus resulting in a bonded laminate. In some embodiments, the can is removed from the laminate; however, in some preferred embodiments, the can remains on the exterior of the laminate and forms a hermetic seal around the circumference of the laminate. Portions of the exterior may be removed; for example, by machining to create inlets and outlets. Alternatively, the device may have inlet and outlet features already present so that no machining is necessary if the can doesn't block the inlets or outlets. In another alternative, inlets and outlets can be supplied with breakaway features that can be pulled off to create inlets and outlets. In some preferred embodiments, a void or voids within a laminate are pressurized during the HIPing process, which can help resist deformation of void space as well as help transfer bonding pressure to laminae on either side of the void.

Another preferred bonding method is hot isostatic pressing to achieve transient liquid phase (TLP) diffusion bonding. Unlike solid-state diffusion bonding, a braze layer is used between the laminae. This braze layer is thin, so that just above its melting temperature, diffusion to and from the laminae cause enough of a concentration change that it solidifies. As a transient liquid phase, the braze alloy is able to flow between the laminae to greatly increase contact between neighboring laminae. Once solidified, the braze material undergoes solid-state diffusion with the laminae.

Numerous microchannel, laminated devices can be made with the components described herein and/or structures described herein and/or made using the methods described herein. Such laminated devices can be, for example, heat exchangers, reactors (integrated combustion reactors are one preferred type of reactor), separators, mixers, combinations of these, and other microchannel, laminated devices that are capable of performing a unit operation. The term "laminated articles" encompasses laminated devices as well as laminated subassemblies.

While the individual laminae are quite thin, the device dimensions are not particularly limited because numerous laminae (of a desired length and width) may be stacked to any desired height. In some preferred embodiments, the inventive articles contain at least 5 laminae, more preferably at least 10, and in some embodiments, more than 50. In some preferred embodiments, the articles contain at least 2, in some embodiments at least 5 repeating units (with each repeating unit containing at least 3 different laminae).

Components of the invention include sheets, strips and flow modifiers. Other components that may be present in laminated articles of the invention include fluid headers and/or footers, and fluid inlets and/or outlets. In some embodiments, at least one fluid is flowing through the laminated article, and in some embodiments, this fluid is a liquid. The header or footer can be shaped to fit an end of a subassembly, for example a square end on a header/footer to match one side of a cubic subassembly.

Figure 8:
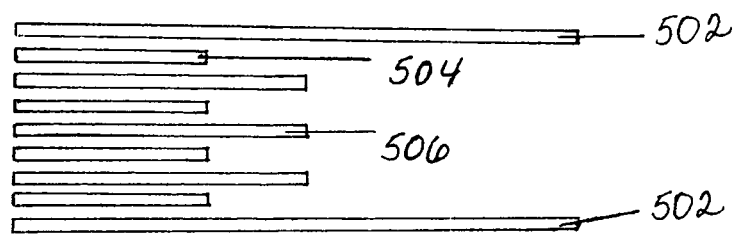
FIGS. 8-11 are overhead views that show various configurations of flow modifiers on a substrate.

Flow modifiers are solid objects located within a flow path (preferably a microchannel flow path, that is, a flow path having at least one dimension of 5 mm or less) that modify flow. Preferably, the articles are designed with flow modifiers that improve flow characteristics. However, in some embodiments, one purpose (in some instances, the sole purpose) of the flow modifiers is to provide structural support—examples include support posts and support ribs. Examples of flow modifiers in laminated articles are shown in FIGS. 8-11. Channel walls 502, 602, 702, 802 are not flow modifiers because they enclose and define a complete flow path. Flow modifiers 504, 506, 614, 616 (which can be support ribs extending between a floor (a low sheet) and a ceiling (an upper sheet)) can be of differing lengths. Ribs such as 504, 506, 614, 616 that do not extend the entire length of a flow path are sometimes called "floating ribs." Floating ribs can, for example, extend for 80% or less, 50% or less, 20% or less of the length of a flow path. The distance d of a "flow path" is the distance along a channel from an inlet to an outlet. Flow modifiers can extend from an inlet and end before reaching an outlet (as shown in FIG. 8); begin after an inlet and extend to an outlet; or begin after an inlet and end before an outlet (for example, ribs 612). Rib sets 610 and 612 are offset in order to redistribute flow lines. In these figures, thickness is the direction perpendicular to the page; length is the longer dimension of the ribs.

Figure 10:
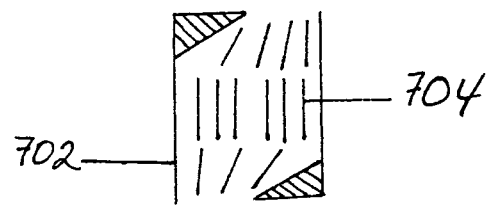
Figure 11:
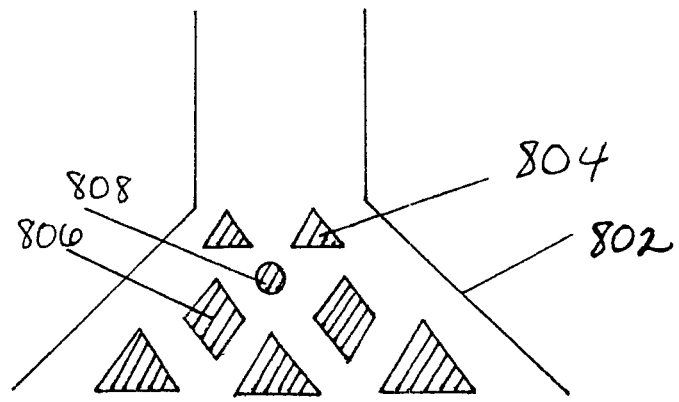

In some preferred embodiments, a flow path contains more flow modifiers 704 in the central region as compared to the header region (nearer an inlet) and/or the footer region (nearer an outlet). See FIG. 10. In this aspect of the invention, flow modifiers are counted across a line that is perpendicular to flow across a flow path and that includes the maximum number of flow modifiers in each section. This configuration allows a shorter header and/or footer, thus reducing structural materials and costs. In some preferred embodiments, the central region has at least 2 more flow modifiers than are present in the header or footer region, in some embodiments at least 5 more flow modifiers than are present in the header or footer region. Another optional flow modifier feature is the use of substantially straight (typically substantially rectangular) flow modifiers disposed at varying angles (such as shown in FIG. 10).

Figure 9:
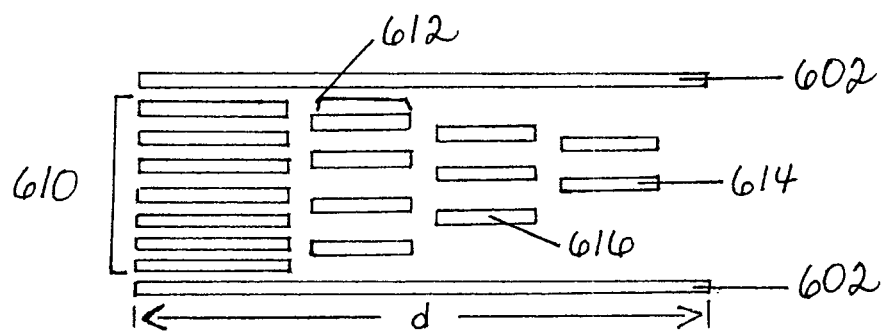

For many embodiments, flow modifiers are preferably long and not wide; for example to provide structural support while minimizing obstructions to flow and maximizing flow space. Typically these modifiers will have a rectangular shape (with length substantially greater than width) as shown in FIGS. 8 and 9, or substantially rectangular with tapered ends. However, in some preferred embodiments, the flow modifiers have one or more shapes selected from the following (as viewed from overhead in the stacking direction): triangle 804, rhombohedron (with no 90 degree angles) 806, circle 808, or irregular shape. These shapes are illustrated as two dimensional considering only length and width; however, in some embodiments, thickness of the flow modifier is also varied. The flow modifiers can also vary in width and/or both, for example, in some preferred embodiments, the flow modifiers comprise wires that are laid down in a flow path. Flow modifiers can also have structures such as a spiral or corkscrew configuration. In some embodiments, the flow modifier is a static mixer(s) that is placed in a flow path. In some preferred embodiments, the flow modifier(s) are continuous over the length of a flow path from an inlet (or header) to an outlet (or footer). In some preferred embodiments, the flow modifier(s) are arced.

Figure 12A:
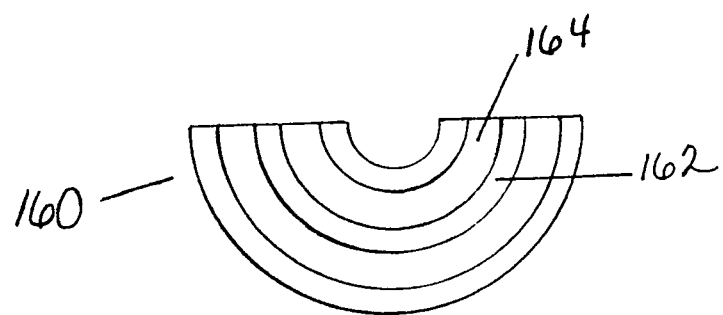
FIGS. 12A-C are overhead views of an arc-shaped reactor with cross-flow channels. The layer shown in FIG. 12A is stacked on the layer shown in FIG. 12B to form a device.
Figure 12B:
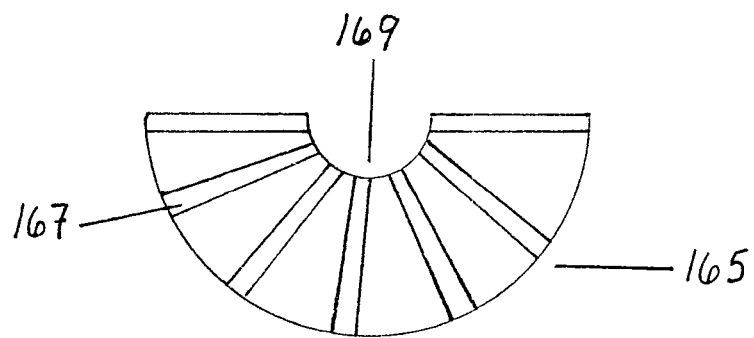
Figure 12C:
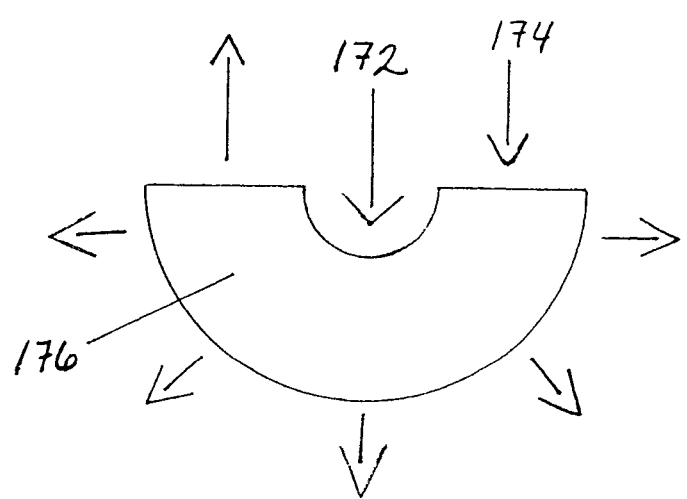
Figure 13:
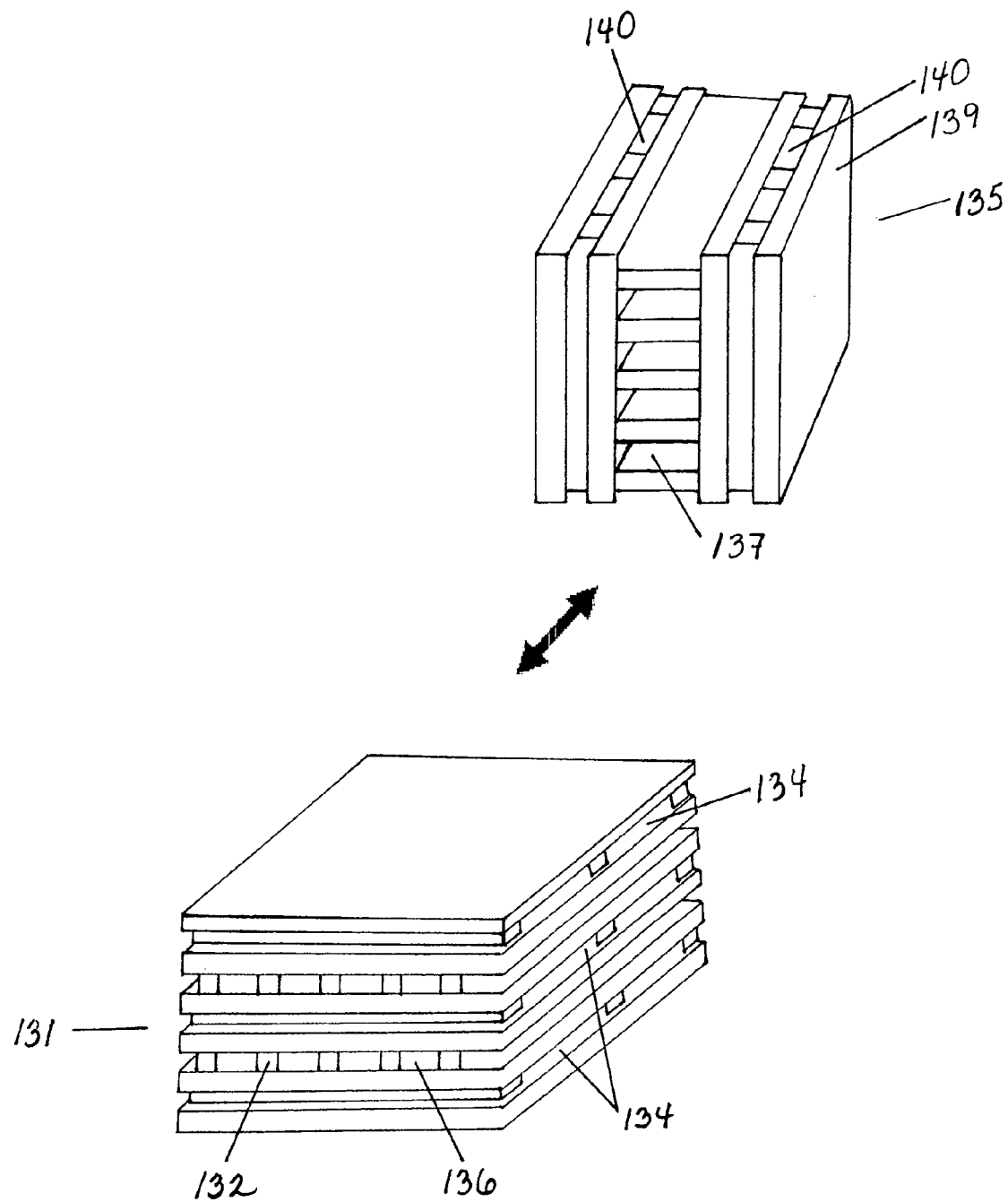
FIG. 13 shows subassemblies that can be brought together in the illustrated orientation.

A preferred reactor configuration is illustrated in FIG. 12. An arced heat exchanger layer 160 has flow modifier/support 162 that may be formed by placing an arced flow modifier on a sheet 164. Adjacent to the heat exchanger layer 160 is reactor layer 165. In the preferred embodiment illustrated in FIG. 12b, support ribs 167 radiate outwards from inlet header region 169. In preferred embodiments, plural reactor layers and heat exchanger layers are stacked in an alternating configuration and bonded to form a laminate. In preferred embodiments, an exothermic reaction composition 172 flows into the reaction layer and an exothermic reaction occurs in the reactor layer, and a coolant or endothermic reaction composition 174 flows through the heat exchanger layer. From a process viewpoint, a process stream sees a flow path that increases in cross-sectional area as it progresses through the reaction zone, thus allowing for increasing contact time as the process stream progresses through the reaction zone. As with other reactor layers described herein, a catalyst may be disposed in the reactor layer in either a flow-by or flow-through type configuration. In the illustrated embodiment, flow of the process stream radiates outward; however, in some other embodiments, a process stream could flow in the opposite direction Another aspect of the invention is illustrated in FIGS. 13-14 which show devices formed by bringing together two subassemblies. FIG. 13 illustrates a subassembly 131 containing layers of process channels 132 interleaved between layers of heat exchange channels 134. This subassembly can be connected with a second subassembly 135. In the illustrated embodiment, process channels 137 in the second subassembly are substantially larger in cross-sectional area as compared to the process channels 136. Heat exchangers 139 (having heat exchanger channels 140) provide temperature control to subassembly 135. In the illustrated embodiment, the ratio of cross-sectional flow area of the process channels in the second subassembly (relative to assembly cross-section, or, alternatively, relative to the cross-section of the heat exchange channel cross-section) is greater than the ratio of cross-sectional flow area of the process channels in the first subassembly. In the device resulting from bringing together the first and second subassemblies in the fashion shown, flow from the process channels sees a larger volume and a corresponding increased contact time within the process channels of the second subassembly. Due in part to shorter heat transport distances, heat transfer rate is faster in the first subassembly. The methods using this type of configuration offer particular advantages for highly exothermic processes that require high rates of heat transfer in the initial stages of a reaction, but require less heat transfer toward the later stages of the reaction. The design of heat transport, distances and float volumes can be precisely tailored to meet the reaction needs of the process that is to be carried out in each individual subassembly.

Connecting subassemblies with parallel microchannels is extremely difficult due to the small tolerances involved. A particular advantage of connecting subassemblies with their layers being perpendicularly oriented is the ability to directly (that is, adjacently) connect micro-channels. In some embodiments, subassemblies are connected in repeating units or with variations in channel cross-sections, such as: a first subassembly leaving (i.e., including) layers with a small average cross-sectional area, connected to a second subassembly that has fewer layers and has layers with a larger average cross-sectional area, and the second assembly is connected to a third assembly that has even fewer layers and has layers with a still larger average cross-sectional area.

FIG. 14 illustrates a preferred method of joining subassemblies such as by using interlocking pieces; in the illustrated example, interlocking substrates (endplates in the figure) 142 interlock with substrates 144. "Interlocking substrates" are components of a subassembly that have a length and/or width that is greater than other components within a stack and that can interlock or fit (an interlocking substrate need not lock together, rather the substrates can fit together and subsequently be bonded to form a fluid connection) with interlocking substrates of another subassembly to form a connection (including a fluid flow path or paths) between the subassemblies. The spacing between layers of the same stack or of different stacks can be the same or different. The subassemblies can be bonded using any of the bonding techniques discussed herein. For connecting more than 2 subassemblies, the interlocking substrates can overhang (extend beyond the width or length of the other components) on two sides. The subassemblies can be designed so that, when properly interlocked, the channels within each subassembly are in direct contact. Alternatively, the subassemblies can be designed with interlocking substrates that leave an inter-channel space in which mixing can occur. Typically, headers (not shown) for process or heat exchange fluids would be connected to the open faces. The illustrated embodiment shows substrates with sides and rectangular edges, but it should be appreciated that the substrates can have other shapes, for example, beveled edges that can mate with beveled edges of a second subassembly.

Figure 15A:
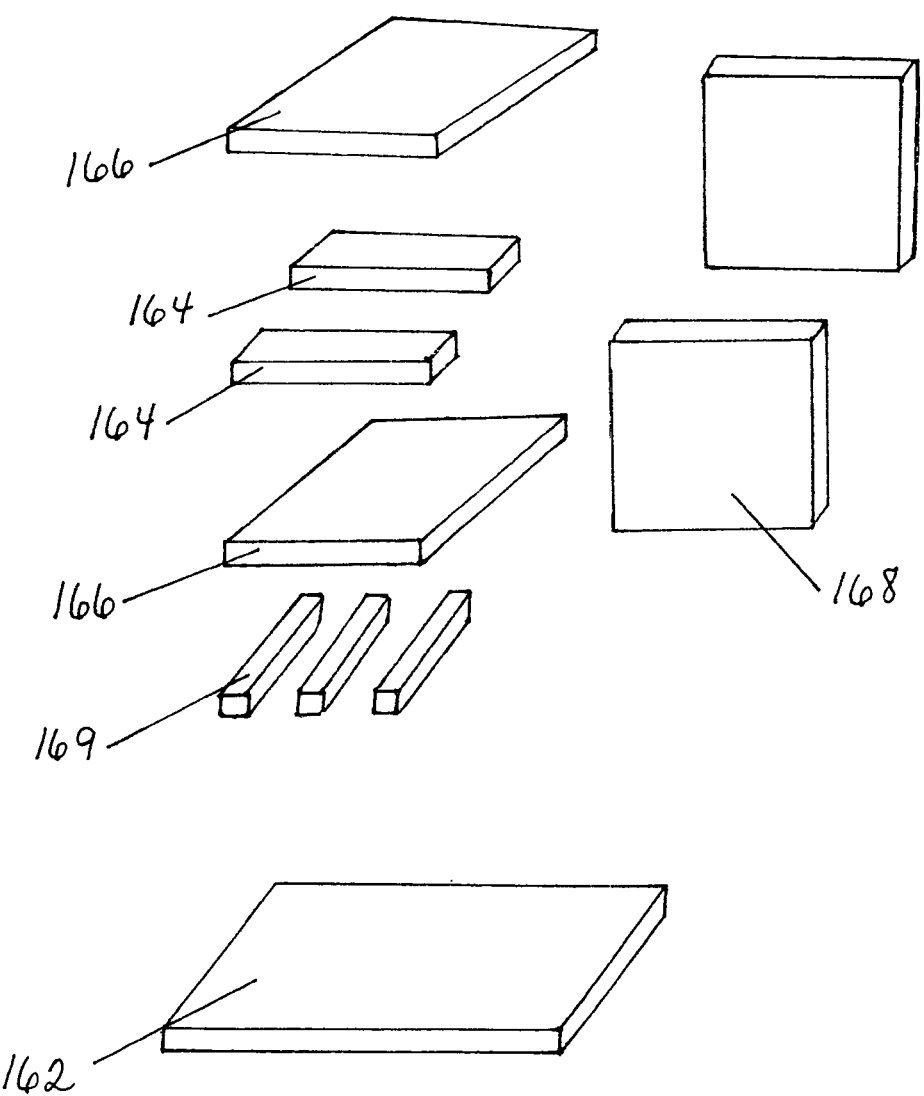
FIG. 15a is an exploded view of a laminated device.
Figure 15:
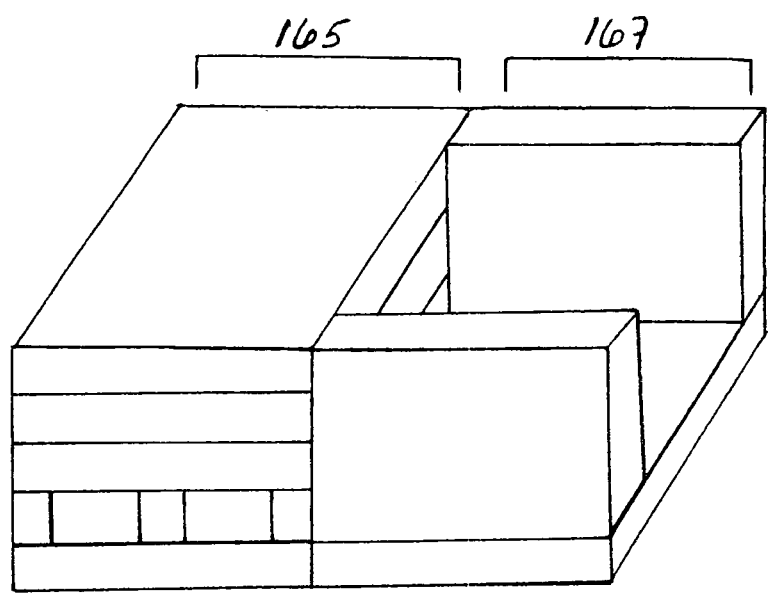
FIG. 15b is a perspective view of an assembled device.

FIGS. 15a and 15b illustrate an integrated laminated device made with multilayer channels disposed within an integrated device. FIG. 15a shows an exploded view including substrate 162, flow modifiers 164, 169 channel blocks 168 and thin sheets 166. The assembled device is illustrated in FIG. 15b including a first section 165 and a second section 167. In some preferred embodiments, a process stream flows between sheets 166 and around flow modifiers 164. A heat exchange fluid (or second process stream) flows perpendicularly to the process stream between substrate 162 and sheet 166. This configuration also makes it possible to provide heat transfer where it is most needed while leaving more space for unit operations where a high degree of heat transfer is not needed. Typically, the cross-sectional area of the continuous flow channels will change in a stepwise fashion.

Figure 16:
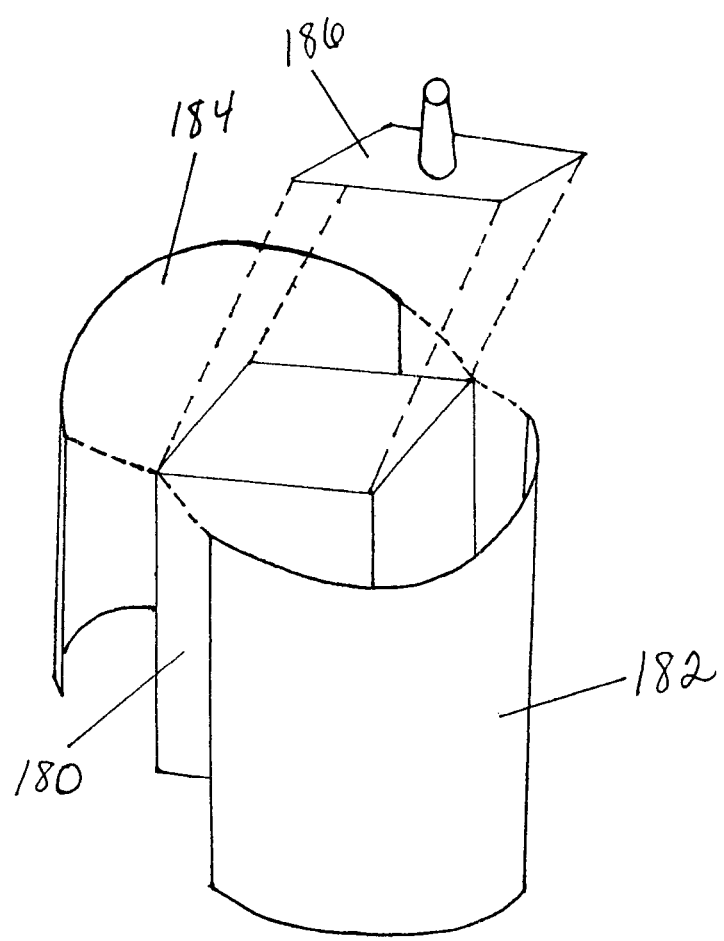
FIG. 16 is an exploded view of a laminated cube in a tube.

FIG. 16 illustrates a six-sided laminated device with openings on all six sides. The laminated device 180 can be housed in a pipe by sealing together two half pipes 182, 184. A manufacturing advantage is that only two seals are required to enclose four sides of the device. In a preferred embodiment, at least two opposing edges of the laminated device contact the interior of the pipe and/or are sealed to the interior of the pipe. During operation, a first process stream can pass from side 184 to side 182, while a second process stream passes perpendicularly through the device and can be collected in footer 186. A square face is shown, it should be recognized that the header/footer can be designed to match the shape of any subassembly. The device 180 can be a single assembly or a collection of interlocking subassemblies.

Any of the sheets, strips and flow modifiers can be etched to introduce desired features. However, in order to reduce costs and increase choice of materials, in some preferred embodiments, features (such as flow modifiers) are welded or otherwise adhered to a surface. In some preferred embodiments, the components and devices are prepared without etching.

The articles may be made of materials such as plastic, metal, ceramic, glass and composites, or combinations, depending on the desired characteristics. In some preferred embodiments, the articles described herein are constructed from hard materials such as a ceramic, an iron based alloy such as steel, or monel, or high temperature nickel based superalloys such as Inconel 625, Inconel 617 or Haynes alloy 230. In some preferred embodiments, the apparatuses are comprised of a material that is durable and has good thermal conductivity. In some embodiments, the apparatuses can be constructed from other materials such as plastic, glass and composites. Of course, materials such as brazes, adhesives and catalysts are utilized in some embodiments of the invention.

The present invention includes chemical reactions that are conducted in any of the apparatus or methods of conducting reactions that are described herein. As is known, the small dimensions can result in superior efficiencies due to short heat and mass transfer distances. Reactions can be uncatalyzed but are preferably catalyzed with a homogenous or heterogeneous catalyst. Heterogeneous catalysts can be powders, coatings on chamber walls, or inserts (solid inserts like foils or porous inserts). Catalysts suitable for catalyzing a selected reaction are known in the art and catalysts specifically designed for microchannel reactors have been recently developed. In some preferred embodiments of the present invention, catalysts can be a porous catalyst. The "porous catalyst" described herein refers to a porous material having a pore volume of 5 to 98%, more preferably 30 to 95% of the total porous material's volume. At least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by Mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase catalysis conditions. The porous material can itself be a catalyst, but more preferably the porous material comprises a metal, ceramic or composite support having a layer or layers of a catalyst material or materials deposited thereon. The porosity cain be geometrically regular as in a honeycomb or parallel pore structure, or porosity may be geometrically tortuous or random. In some preferred embodiments; the support of the porous material is a foam metal, foam ceramic, metal felt (i.e., matted, nonwoven fibers), or metal screen. The porous structures could be oriented in either a flow-by or flow-through orientation. The catalyst could also take the form of a metal gauze that is parallel to the direction of flow in a flow-by catalyst configuration.

Alternatively, a catalyst support could be formed from a dense metal shim or foil. A porous catalyst layer could be coated on the dense metal to provide sufficient active surface sites for reaction. A active catalyst metal or metal oxide could then be washcoated either sequentially or concurrently to form the active catalyst structure. The dense metal foil or shim would form an insert structure that would be placed inside the reactor either before or after bonding or forming the microchannel structure. A catalyst can be deposited on the insert after the catalyst has been inserted. Preferably, the catalyst insert contacts the wall or walls that are adjacent both the endothermic and exothermic reaction chambers.

A porous catalyst could alternatively be affixed to the reactor wall through a coating process. The coating may contain a first porous layer to increase the number of active sites. Preferably, the volume average pore diameter of the catalyst ranges from tens of nanometers (for example, 10 or 20 nm) to tens of microns (for example, 10 or 50 micrometers). An active metal or metal oxide catalyst can then be sequentially or concurrently washcoated on the first porous coating.

Preferred major active constituents of the catalysts include: elements in the IUPAC Group IIA, IVA, VA, VIA, VIIA, VIIIA, IB, IIB, IVB, Lanthanide series and Actinide series. The catalyst layers, if present, are preferably also porous. If a porous support is used, the average pore size (volume average) of the catalyst layer(s) is preferably smaller than the average pore size of the support. The average pore sizes in the catalyst layer(s) disposed upon the support preferably ranges from $10^{-9}$ m to $10^{-7}$ in as measured by $N_2$ adsorption with BET method. More preferably, at least 50 volume % of the total pore volume is composed of pores in the size range of $10^{-9}$ m to $10^{-7}$ m in diameter. Diffusion within these small pores in the catalyst layer(s) is typically Knudsen in nature for gas phase systems, whereby the molecules collide with the walls of the pores more frequently than with other gas phase molecules.

In some preferred embodiments, catalysts are in the form of inserts that can be conveniently inserted and removed from a reaction chamber. Reaction chambers (either of the same type or of different types) call be combined in series with multiple types of catalysts. For example, reactants can be passed through a first reaction chamber containing a first type of catalyst, and the products from this chamber passed into a subsequent reaction chamber (or a subsequent stage of the same reaction chamber) containing a second type of catalyst in which the product (or more correctly termed, the intermediate) is converted to a more desired product. If desired, additional reactant(s) can be added to the subsequent reaction chamber.

A catalyst (which is not necessarily porous) could also be applied by other methods such as wash coating. On metal surfaces, it is preferred to first apply a buffer layer by chemical vapor deposition, thermal oxidation, etc. which improves adhesion of subsequent wash coats.

Sacrificial Shims for Diffusion Bonding

The pressures applied during diffusion bonding of shims can create undesired channel compression. Due to the high temperatures required for diffusion bonding, the material that is under load will inelastically deform to some extent clue to loading beyond its yield strength and creep during the time required for bonding. Channel compression can be mitigated through the use of sacrificial shims placed on either side (or alternatively only one-side) of the shim stack and separated from the flow channels by at least one wall shim or wall plate. The sacrificial shim is generally described as a large open pocket that covers the otherwise open pockets in the shim stack. The sacrificial shim pocket takes up a portion of the deformation produced by the bonding force and generally is compressed after the bonding cycle. Sections of a shim stack wherein there is no material will not transfer any force.

In press bonding, the sacrificial shims absorb the deformation forces and help keep the internal dimensions consistent ill the open areas which are used for operation. Thus, die internal voids are unaffected while the outer voids (sacrificial slots) are significantly deformed.

For any bonding method (axial pressing or isostatic pressing) if the open areas in the sacrificial shims are extended wider than the operating channels, the ends of the channels are not loaded directly, and the change in length in the working channels is reduced. Thus, preferably, sacrificial voids extend farther (for example, are longer) than the working channels they are protecting.

Sacrificial shims may take the form of one or multiple shims that are stacked together or separated by solid walls. The sacrificial shims may be near the desired shim stack and separated by a single shim having a thickness (height) of 0.25 mm or less. The sacrificial shims could alternatively be placed a greater distance from the shim stack, or more than 6 mm. Although sacrificial shims preferably are outside (that is, closer to a surface than) the process channels, sacrificial shims could also be placed elsewhere within the shim stack. The channels in the sacrificial shim are not in fluid contact with ally of the streams that, during device operation, participate in the desired device unit operations. The chambers are vacant, or could alternatively be later filled with a fluid to either promote or minimize thermal losses to the environment or to axial conduction along the length of the device.

The concept of sacrificial shims could also be applied to application in 3-D bonding methods such as HIP which also load the shims perpendicular to the bonding direction. The sides of the shims could be covered with a shroud or an open pocket to take up die compression during bonding without deforming the desired-channels. In alternative configurations, the pockets could be formed in external components attached to the side of the shim stack, or pockets could be formed in each shim in the stack to create the sacrificial shroud.

The invention also includes processes of conducting one or more unit operations in any of the laminated devices of the invention. Suitable operating conditions for conducting a unit operation can be identified through routine experimentation. Reactions of the present invention include: acetylation, addition reactions, alkylation, dealkylation, hydrodealkylation, reductive alkylation, amination, ammoxidation aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dehydrogenation, oxydehydrogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogeniolysis, hydrometallation, hydrosilation, hydrolysis, hydrotreating (including hydrodesulferization, HDS/HDN), isomerization, methylation, demethylation, metathesis, nitration, oxidation, partial oxidation, polymerization, reduction, reformation, reverse water gas shift, Sabatier, sulfonation, telomerization, transesterification, thimerization, and water gas shift. For each of the reactions listed above, there are catalysts and conditions known to those skilled in the art; and the present invention includes apparatus and methods utilizing these catalysts. For example, the invention includes methods of amination through an amination catalyst and apparatus containing an amination catalyst. The invention can be thusly described for each of the reactions listed above, either individually (e.g., hydrogenolysis), or in groups (e.g., hydrohalogenation, hydrometallation and hydrosilation with hydrohalogenation, hydrometallation and hydrosilation catalyst, respectively). Suitable process conditions for each reaction, utilizing apparatus of the present invention and catalysts that can be identified through knowledge of the prior art and/or routine experimentation. To cite one example, the invention provides a Fischer-Tropsch reaction using a laminated device (specifically, a reactor) as described herein.

EXAMPLES

Figure 17:
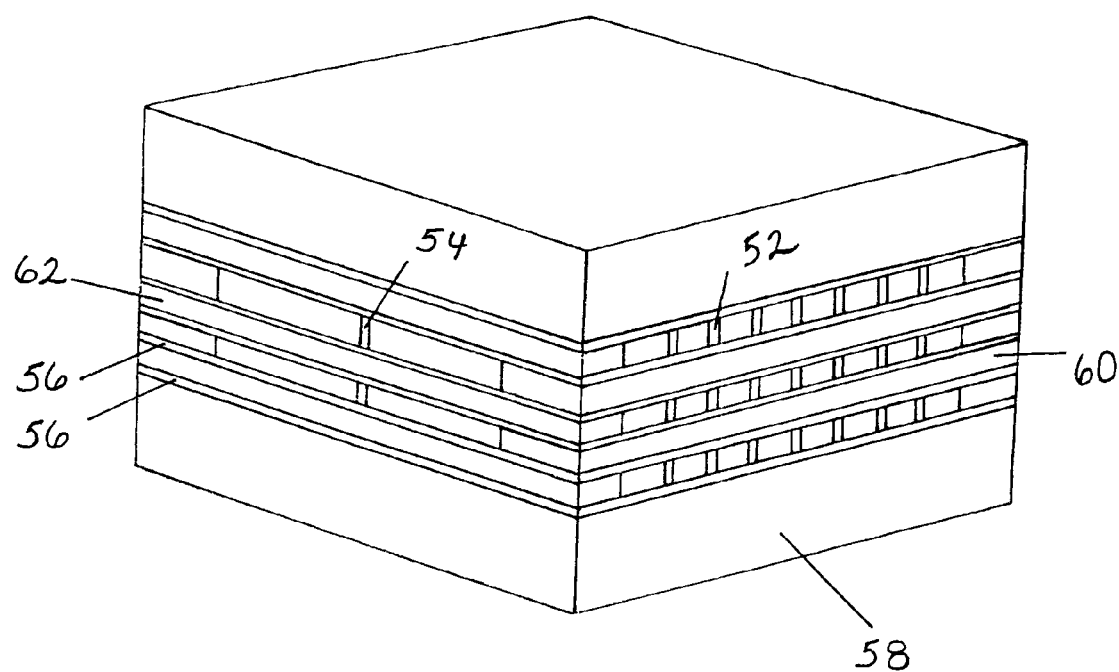
FIG. 17 is a perspective view of an assembled device described in the Examples.

A test device was constructed from the following pieces (described with thickness in the stacking direction, and reference numerals corresponding to FIG. 17):

52. ribs 0.06 inch wide×0.1 inch thick×3.685 inch long;
54. ribs 0.06 inch wide×0.2 inch thick×3.130 inch long;

Ribs 0.06 inch wide×0.200 inch thick×2.14 inch long (second type of rib)
56. thin sheets 3.140 inch wide×0.020 (??) inch thick×3.690 inch long;
58. base plates 3.140 inch wide×0.5 inch thick×3.690 inch long;
60. edge strips 0.500 inch wide×0.2 inch thick×3.140 inch long;
62. edge strips 0.500 inch wide×0.1 inch thick×3.690 inch long; and
64. braze foil is placed above and below each edge strip.

During construction, the ribs are aligned on a thin sheet using the comb-like fixture described above and edge strips were also placed on the thin sheet. The ribs and edge strips were tack welded in place. Preferably the welding step uses resistance welding or laser (spot) welding. In this manner, subassemblies were formed. The subassemblies were stacked with brazing on the faces of the edge strips, placed in a braze oven and heated in vacuum to about 800 C.

Pressure differences between the channels and the exterior require the edge strips' perimeters to be sealed to the neighboring wall shims. The outer portions can be sealed by laser welding during the stacking process. With an edge strip exposed on the surface of a partly assembled stack, the lower portion of the edge strip can be laser welded to the sheet that it sits on. After a sheet is stacked on the edge strip, the upper edge strip perimeter can be laser welded to the sheet directly above it by using localized heating that penetrates through the sheet to the joint.

A second device was formed by the same methods, but with the following pieces:
wires (ribs) 0.01 diameter×7 inch long;
ribs 0.04 inch wide×0.04 inch thick×5.0 inch long;
thin sheets 5.0 inch wide×0.015 inch thick×7.0 inch long;
base plates 5.0 inch wide×0.5 inch thick×7.0 inch long;
edge strips 0.5 inch wide×0.01 inch thick×7.0 inch long;
edge strips 0.5 inch wide×0.04 inch thick×5.0 inch long; and
braze foil.

In the second device, the wires were aligned with a 0.03 inch gap between wires and 99 wires in each layer.

The test devices were constructed from 304 or 316 stainless steel with BAg8 or BAg8a Cu—Ag (or Cu—Ag—Li) braze. The lithium-containing braze wicks better into joints and counteracts surface oxidation.

It was discovered that long brazing cycles produced significantly better devices. Based on conventional systems, it was expected that a 4 to 8 hour braze cycle would produce good results; however, it was unexpectedly discovered that longer braze cycle times of about 18 hours produced significantly better results, with cycle times of about 24 hours producing the best results. Alternatively stated, it was found that heating and cooling rates of 1° C./min or less resulted in unexpectedly superior results while faster rates resulted in distortion and deformation of the stack.

It was also discovered that welding a header or footer onto the stack prior to placing the stack in the brazing oven resulted in a laminate with significantly less distortion as compared to a stack without a welded header or footer.

The pieces resulting from the methods described in the examples were leak tested and found not to leak.

We claim:

1. A method of making a laminated device, comprising:
providing a first thin strip having a length-to-width aspect ratio of at least 10 and a length of at least 5 cm;
providing a second thin strip having a length-to-width aspect ratio of at least 10 and a length of at least 5 cm;
placing the first and second strips on a first substrate in a stack so that the strips lie within the same plane wherein the plane is perpendicular to thickness;
placing a second substrate on the first and second strips; and
bonding the first and second strips into the stack such that the strips form walls of a microchannel, and the first and second substrates form opposing walls of the microchannel, and the distance between the strips varies by less than 0.5 mm over the length of the strips;
wherein the bonding is conducted using gradual heating and cooling under at least one of the following conditions:
heating and cooling at a rate of 1° C. per minute or less; or
heating and cooling the stack through a thermal cycle of at least 18 hours.

2. The method of claim 1 wherein the stack comprises sheets made of a high temperature nickel alloy; and further comprises a brazing material with a melting temperature lower than the melting temperature of the nickel alloy, the brazing material being disposed between the sheets; and wherein the bonding step comprises heating and cooling the stack at a rate of 1° C. per minute or less.

3. The method of claim 1 wherein the first substrate is a sheet.

4. The method of claim 3, further comprising applying a brazing compound to the first thin strip prior to the step of placing the strip on the first substrate such that the brazing compound is disposed between the first thin strip and the substrate.

5. A method of making a laminated device, comprising:
providing a first thin strip having a length-to-width aspect ratio of at least 10 and a length of at least 5 cm;
providing a second thin strip having a length-to-width aspect ratio of at least 10 and a length of at least 5 cm;
placing the first and second strips on a first substrate in a stack so that the strips lie within the same plane wherein the plane is perpendicular to thickness;
placing a second substrate on the first and second strips; and
bonding the first and second strips into the stack such that the strips form walls of a microchannel, and the first and second substrates form opposing walls of the microchannel, and the distance between the strips varies by less than 0.5 mm over the length of the strips;
wherein, after the bonding step, a porous catalyst is affixed to the walls of the microchannel.

6. A method of making a laminated device, comprising:
providing a first thin strip having a length-to-width aspect ratio of at least 10 and a length of at least 5 cm;
providing a second thin strip having a length-to-width aspect ratio of at least 10 and a length of at least 5 cm;
placing the first and second strips on a first substrate in a stack so that the strips lie within the same plane wherein the plane is perpendicular to thickness;
placing a second substrate on the first and second strips; and
bonding the first and second strips into the stack such that the strips form walls of a microchannel, and the first and second substrates form opposing walls of the microchannel, and the distance between the strips varies by less than 0.5 mm over the length of the strips;
wherein, after the bonding step, a catalyst is applied to the walls of the microchannel.

7. A method of making a laminated device, comprising:

stacking plural components to form a stack of components; and bonding the stack of components using gradual heating and cooling under at least one of the following conditions:

heating and cooling at a rate of 1° C. per minute or less; or heating and cooling the stack through a thermal cycle of at least 18 hours.

8. The method of claim 7 wherein the plural components comprise thin strips.

9. The method of claim 7 wherein the stack comprises components made of a high temperature nickel alloy; and further comprises a brazing material with a melting temperature lower than the melting temperature of the nickel alloy, the brazing material being disposed between the components; and wherein the bonding step comprises heating and cooling the stack at a rate of 1° C. per minute or less.

10. The method of claim 9 further comprising a step of bonding a header or a footer onto the stack of components prior to the step of bonding the stack of components.

11. The method of claim 10 comprising a step of bonding both a header and a footer onto the stack of components prior to the bonding step.

12. The method of claim 9 wherein the brazing material comprises a nickel phosphorus alloy or a nickel boron alloy.

13. The method of claim 9 wherein the bonding step occurs at a temperature in the range of 1000 to 1050 C.

14. The method of claim 9 wherein the strips are not connected to a substrate prior to the step of bonding.

15. The method of claim 9 wherein the distance between the strips varies by less than 0.05 mm over the length of the strips.

16. The method of claim 7 further comprising a step of bonding a header or a footer onto the stack of components prior to the bonding step.

17. The method of claim 7 wherein the components are laminae and the stack of components comprise more than 50 laminae.

18. The method of claim 17 wherein the bonding is conducted using gradual heating and cooling of the stack through a thermal cycle of at least 18 hours.

19. The method of claim 7 wherein, after the bonding step, a catalyst is applied to interior walls of the laminated device.

* * * * *